(12) United States Patent
Sasaki et al.

(10) Patent No.: US 10,298,102 B2
(45) Date of Patent: May 21, 2019

(54) METHOD OF MANUFACTURING LAMINATED CORE

(71) Applicant: Mitsui High-tec, Inc., Yahatanishi-ku, Kitakyushu-shi, Fukuoka (JP)

(72) Inventors: Katsuhiro Sasaki, Kitakyushu (JP); Takashi Fukumoto, Kitakyushu (JP); Mei Ogata, Kitakyushu (JP)

(73) Assignee: MITSUI HIGH-TEC, INC., Yahatanishi-Ku, Kitakyushu-Shi, Fukuoka (JP)

( * ) Notice: Subject to any disclaimer, the term of this patent is extended or adjusted under 35 U.S.C. 154(b) by 103 days.

(21) Appl. No.: 15/197,258

(22) Filed: Jun. 29, 2016

(65) Prior Publication Data

US 2017/0005551 A1 Jan. 5, 2017

(30) Foreign Application Priority Data

Jun. 30, 2015 (JP) .................................. 2015-131708

(51) Int. Cl.
| | |
|---|---|
| *H02K 15/00* | (2006.01) |
| *H02K 15/14* | (2006.01) |
| *H02K 15/16* | (2006.01) |
| *H02K 15/02* | (2006.01) |

(52) U.S. Cl.
CPC ......... *H02K 15/02* (2013.01); *H02K 2201/09* (2013.01)

(58) Field of Classification Search
CPC ............................. H02K 1/148; H02K 15/022
See application file for complete search history.

(56) References Cited

U.S. PATENT DOCUMENTS

| 6,484,387 B1 | 11/2002 | Lee et al. | |
|---|---|---|---|
| 2003/0066183 A1* | 4/2003 | Nouzumi | H02K 1/148 29/596 |
| 2014/0210306 A1* | 7/2014 | Suzuki | H02K 1/185 310/216.134 |

FOREIGN PATENT DOCUMENTS

| CN | 102891571 | | 1/2013 |
|---|---|---|---|
| JP | S52-156305 | | 12/1977 |
| JP | H11-55906 | | 2/1999 |
| JP | 11252872 A | * | 9/1999 |
| JP | 2010-263757 | | 11/2010 |

* cited by examiner

*Primary Examiner* — Paul D Kim

(74) *Attorney, Agent, or Firm* — Procopio, Cory, Hargreaves & Savitch LLP

(57) ABSTRACT

A method of manufacturing a laminated core is provided. The manufacturing method includes the steps of feeding a belt-like sheet of core material to a progressive die, stamping out core pieces having a first shape from the core material, stacking more than one of the core pieces having the first shape to obtain a first laminate block, stamping out core pieces having a second shape from the core material, stacking more than one of the core pieces having the second shape to obtain a second laminate block, discharging a laminate including the first laminate block and the second laminate block from the progressive die, changing the lamination order of the laminate blocks constituting the laminate, and integrating the laminate after the lamination order of the laminate blocks are changed.

11 Claims, 8 Drawing Sheets

Fig.6
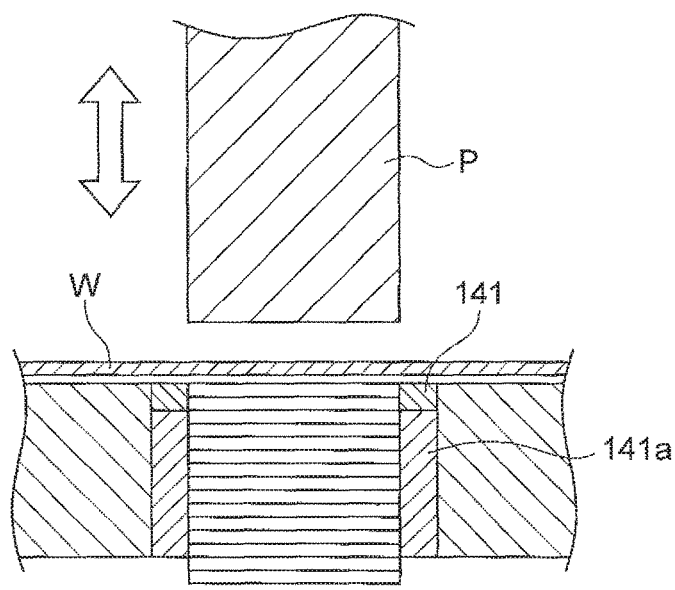
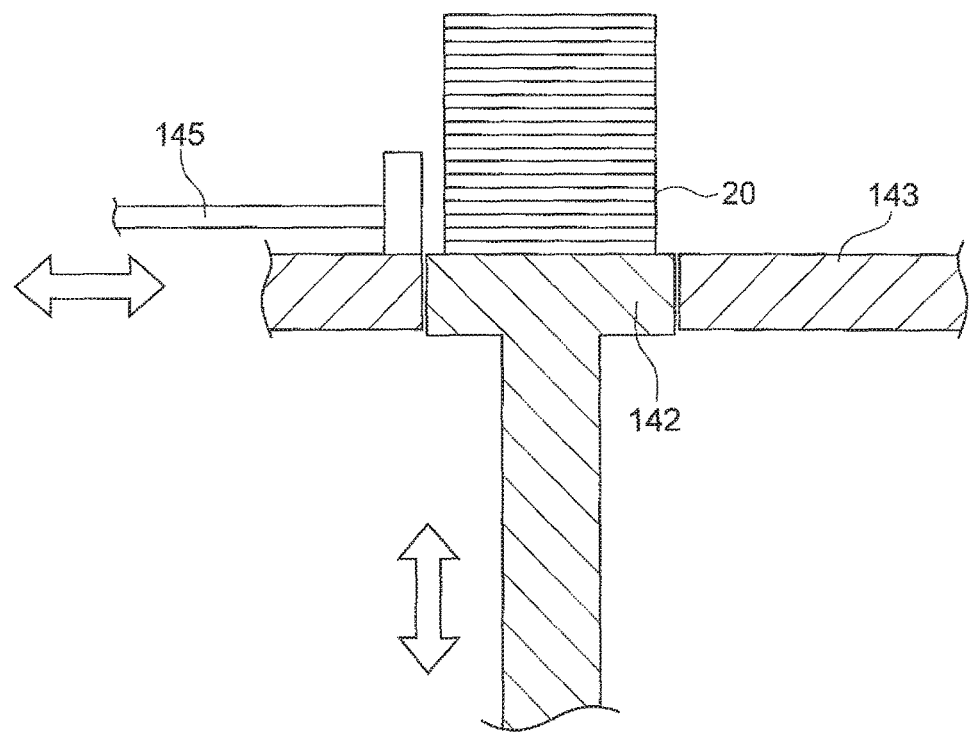

METHOD OF MANUFACTURING LAMINATED CORE

CROSS-REFERENCE TO RELATED APPLICATION

This application is based upon and claims the benefit of priority from Japanese Patent Application No. 2015-131708, filed Jun. 30, 2015, the entire contents of which are incorporated herein by reference.

BACKGROUND

1. Field

This disclosure relates to a method of manufacturing a laminated core and, more specifically, to a method of manufacturing a laminated core constituted by combining core pieces of equal to or more than two different shapes.

A laminated core is a component of a motor. The laminated core is formed by stacking a plurality of core pieces each of which is processed in a predetermined shape, and fastening the pieces together. The motor includes a rotor and a stator each of which contains a laminated core, and is produced through a step of winding a coil on the stator and a step of attaching a shaft to the rotor, for example. Motors incorporating laminated cores have been conventionally used as driving sources for appliances, such as a refrigerator, an air conditioner, a hard disc drive, and an electric tool, and are also used as driving sources for hybrid cars in recent years.

A progressive die is commonly used for manufacturing a laminated core. In this progressive die, core pieces are serially stamped out from a belt-like core material, and a plurality of core pieces are stacked until a predetermined lamination thickness is obtained. The thickness of a laminate discharged from the progressive die is required to be within a tolerance depending a the thickness of a laminated core to be produced. However, the thickness of the belt-like core material is not necessarily uniform, in other words, there are variations in thickness. Thus, the thickness of the laminate may not be within a tolerance because of effects of variations in thickness when a predetermined number of core pieces are simply laminated.

2. Related Background Art

Japanese Unexamined Patent Publication No. 52-156305 discloses a device with which laminated cores having a constant thickness are obtained regardless of variations in thickness of core pieces by measuring the thicknesses of the core pieces to be laminated in advance and controlling a stamping device on the basis of the measured data.

Japanese Unexamined Patent Publication No. 11-55906 discloses a method of manufacturing a counterbored laminated core, in other words, a laminated core constituted by combining core pieces of equal to or more than two different shapes. In the manufacturing method disclosed in Japanese Unexamined Patent Publication No. 11-55906, a control program is used that corrects the number of sheets to be laminated by specifying one of counterbores except for counterbores with which the number of sheets to be laminated is specified. A laminated core constituted by combining core pieces of equal to or more than two different shapes is not limited to counterbored laminated cores, and another example is a laminated core internally having a flow path for a refrigerant (see Japanese Unexamined Patent Publication No. 2010-263757).

SUMMARY

One aspect of this disclosure relates to a method of manufacturing a laminated core constituted by combining core pieces of equal to or more than two different shapes. This manufacturing method includes the steps of feeding a belt-like core material to a progressive die, stamping out core pieces having a first shape from the core material, stacking more than one of the core pieces having the first shape to obtain a first laminate block, stamping out core pieces having a second shape from the core material, stacking more than one of the core pieces having the second shape to obtain a second laminate block, discharging a laminate including the first laminate block and the second laminate block from the progressive die, changing the lamination order of the laminate blocks constituting the laminate, and integrating the laminate after the lamination order of the laminate blocks are changed.

BRIEF DESCRIPTION OF THE DRAWINGS

FIG. 6 is a schematic sectional view of a mechanism for laminating core pieces and a mechanism for discharging a laminate from the die.

DETAILED DESCRIPTION

Figure 1:
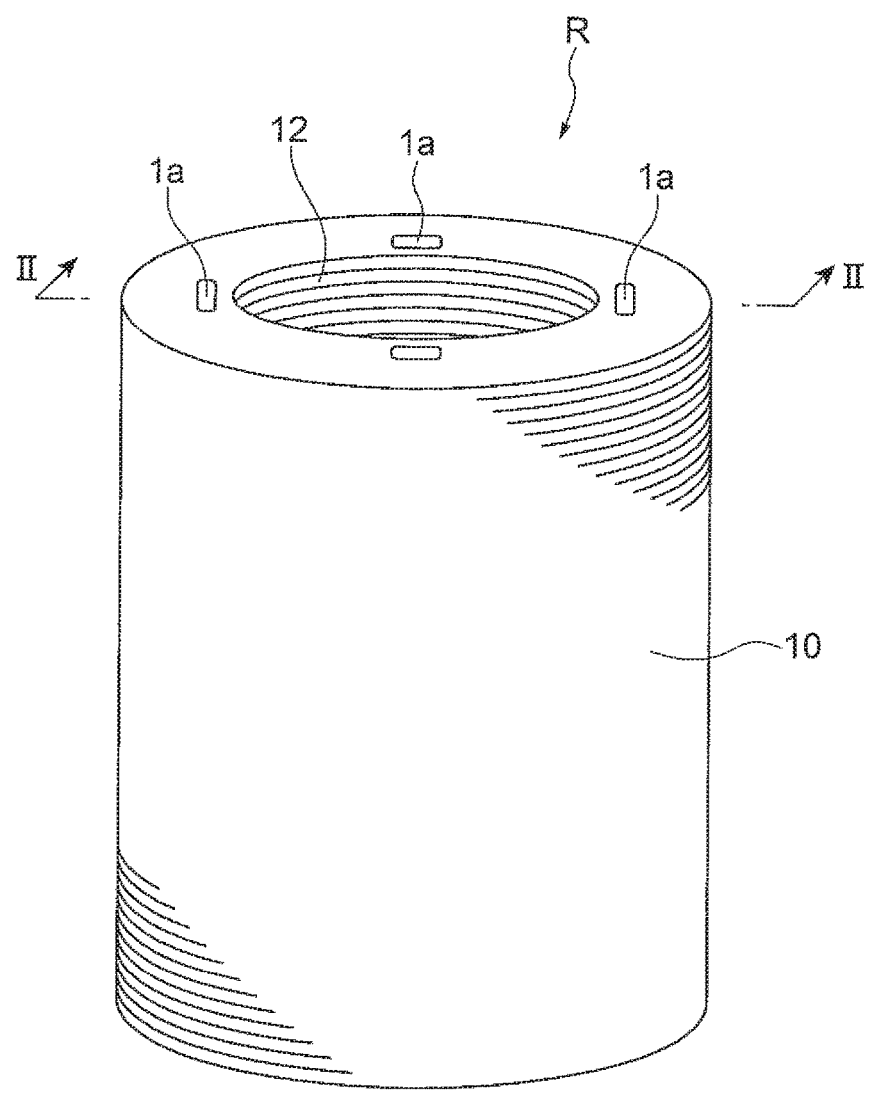
FIG. 1 is a perspective view of one example of a laminated core for a rotor.

Hereinafter, a plurality of embodiments of the present invention will be described with reference to the accompanying drawings. In the description of the drawings, the same elements will be designated by the same reference numerals and a duplicate description thereof will be omitted. The drawings and the related technologies are provided in order to describe the embodiments of the present invention, and do not limit the scope of the present invention.

[Laminated Core for Rotor]

Figure 2:
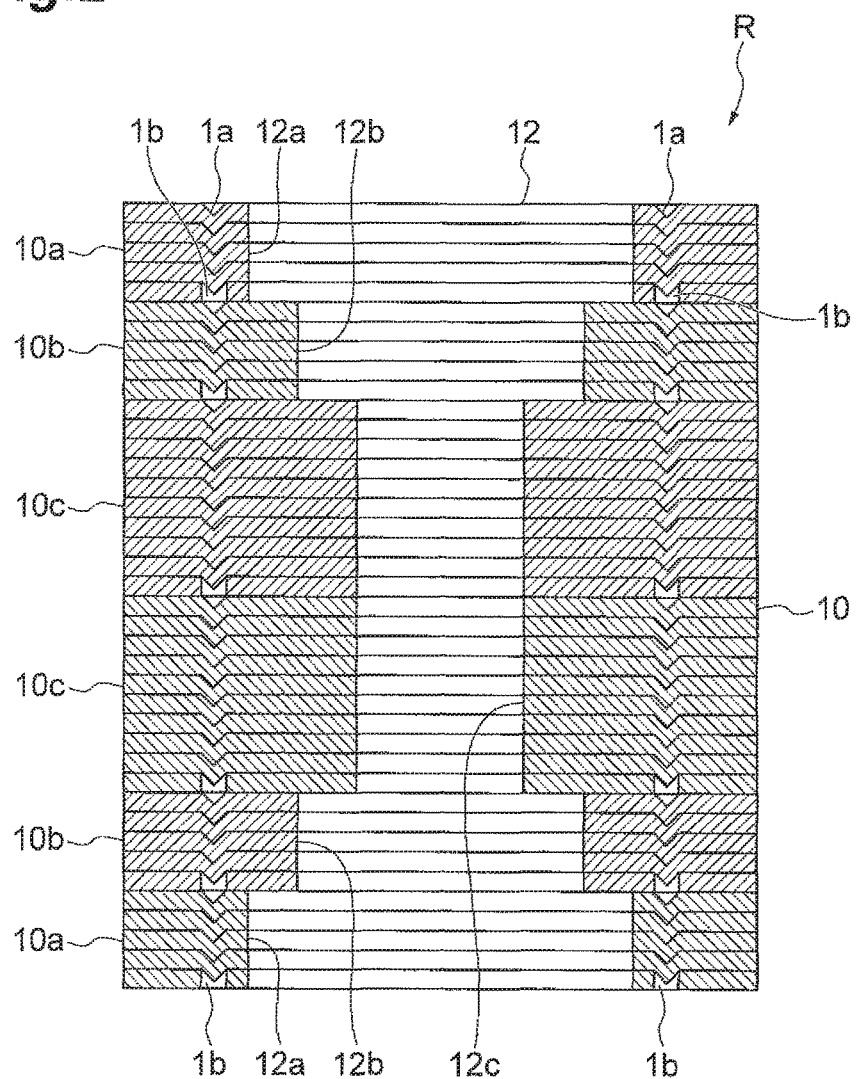
FIG. 2 is a schematic sectional view along line II-II in FIG. 1.

FIG. 1 and FIG. 2 are a perspective view and a sectional view, respectively, of a laminated core R for a rotor according to the present embodiment. The shape of the laminated core R is substantially cylindrical. The laminated core R includes a laminate 10 including a plurality of core pieces, and a shaft hole 12, positioned in a central part of the laminate 10, into which a shaft (not depicted) is inserted. As depicted in FIG. 2, the shaft hole 12 is a counterbore in which the inner diameter is enlarged in steps at both end portions. Specifically, the shaft hole 12 is constituted of first expanded-diameter parts 12a formed at both ends and having the largest inner diameter, second expanded-diameter parts 12b respectively formed on inner sides of the first expanded-diameter parts 12a, and a shaft-hole body part 12c formed so that the two second expanded-diameter parts 12b communicate with each other.

The laminate 10 is constituted of three pairs of (a total of six) laminate blocks 10a, 10b, and 10c sorted by the size of the inner diameter of the shaft hole 12. As depicted in FIG. 2, beginning at the bottom, the laminate block 10a, the laminate block 10b, the laminate block 10c, the laminate block 10c, the laminate block 10b, and the laminate block 10a are laminated in this order in the laminate 10. To reduce the effect of variations in thickness of a core material, rotational lamination is preferably performed between respective laminate blocks. The term "rotational lamination" here means relative shifting of the angle between a laminate of laminate blocks that have been stacked and a laminate block to be newly stacked on the laminate when a laminate is obtained by laminating laminate blocks.

The laminate block 10a constitutes the first expanded-diameter part 12a and has the same lamination thickness as that of the laminate block 10b. A plurality of core pieces constituting the laminate block 10a are fastened to each other by swaged areas 1a. The laminate block 10b constitutes the second expanded-diameter part 12b. A plurality of core pieces constituting the laminate block 10b are also fastened to each other by the swaged areas 1a. The laminate blocks 10c constitute the shaft-hole body part 12c and have the largest lamination thickness among the laminate blocks 10a, 10b, and 10c. In the present embodiment, the laminate block 10c corresponds to a laminate block that does not have large effects on performances of the laminated core R when the lamination thickness changes to some extent. A plurality of core pieces constituting the laminate block 10c are also fastened to each other by the swaged areas 1a.

As depicted in FIG. 2, punched holes 1b are formed instead of the swaged areas 1a on core pieces respectively constituting the lowermost layers of the laminate bocks 10a, 10b, and 10c. Forming the punched holes 1b on the core pieces constituting the lowermost layers can prevent a laminate block from being fastened to another laminate block to be stacked on the laminate block in a manufacturing process of the laminated core R. A plurality of laminate blocks constituting the laminated core R are finally integrated by welding or adhesion. The laminate blocks may be integrated by forming, on each core piece, an opening (not depicted) for filling a resin and filling the opening with a resin.

[Laminate Manufacturing Apparatus]

Figure 3:
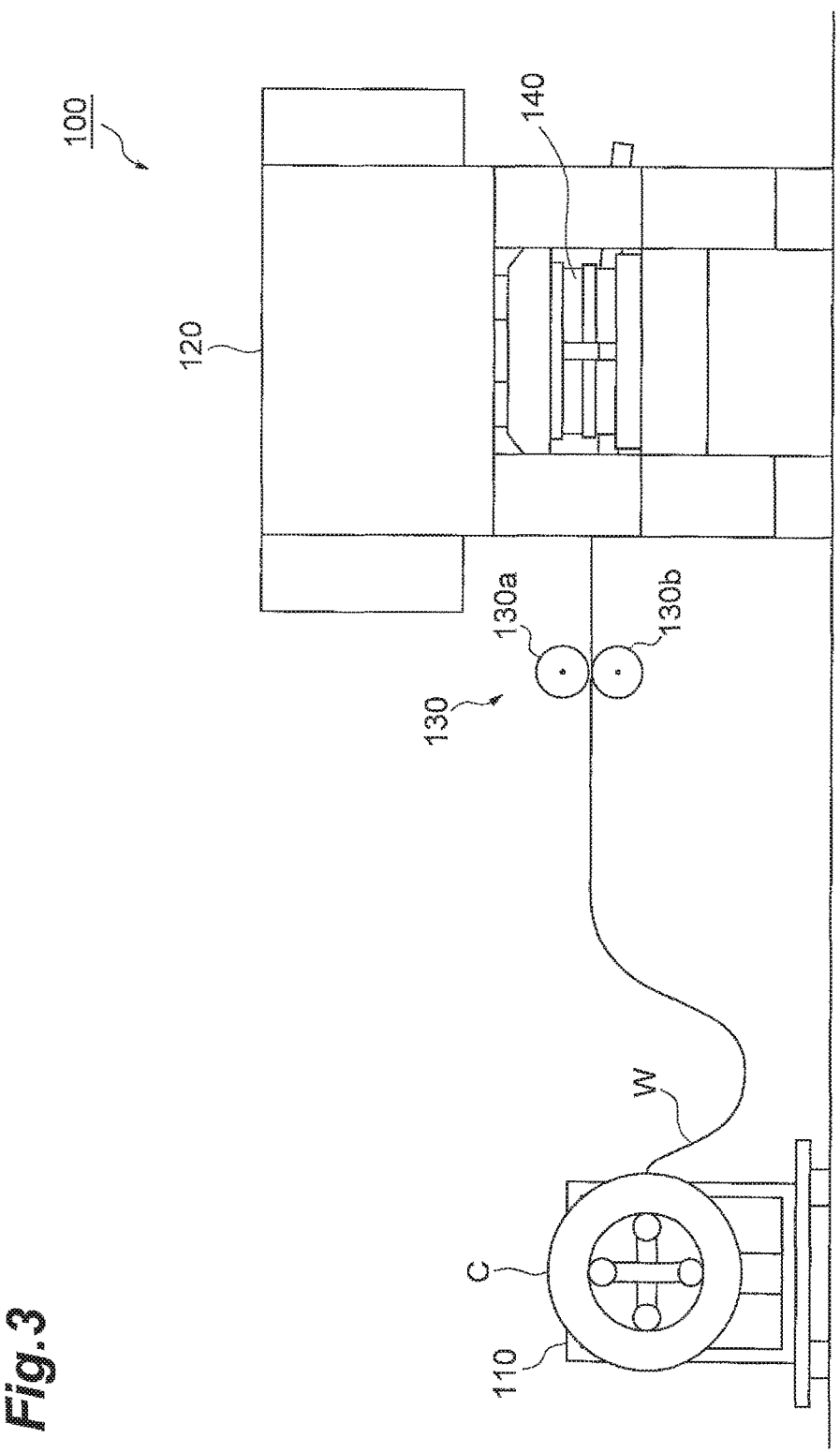
FIG. 3 is a schematic diagram illustrating one example of a laminate manufacturing apparatus provided with a progressive die.
Figure 4:
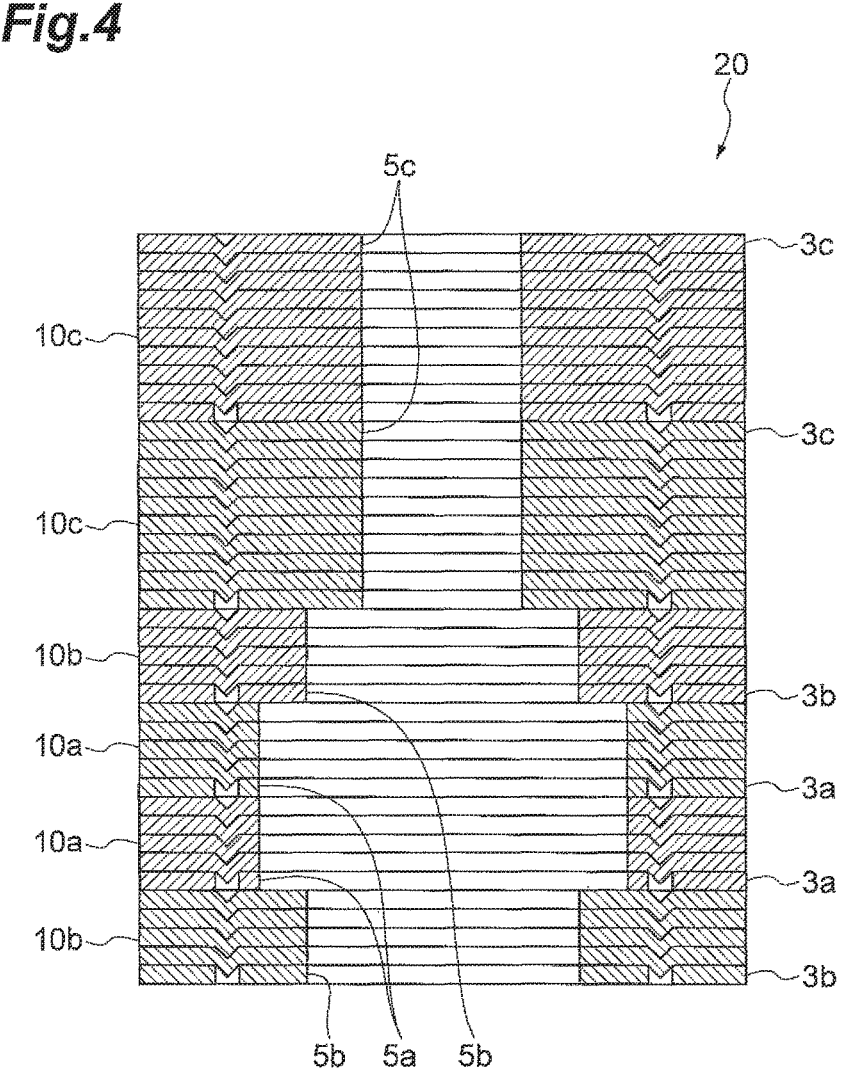
FIG. 4 is a schematic sectional view of one example of a laminate manufactured with the laminate manufacturing apparatus.

FIG. 3 is a schematic diagram illustrating one example of an apparatus for manufacturing a laminate by stamping out core pieces of equal to or more than two different shapes. This laminate manufacturing apparatus 100 produces a laminate 20 depicted in FIG. 4. The laminate 20 is the same as the laminate 10 depicted in FIG. 2 in that the laminate is constituted by the laminate blocks 10a, 10b, and 10c, but the lamination order of these laminate blocks is different. As depicted in FIG. 4, beginning at the bottom, the laminate block. 10b (first laminate block), the laminate block 10a, the laminate block 10a, the laminate block 10b, the laminate block 10c, and the laminate block 10c (second laminate block) are laminated in this order in the laminate 20. The laminate 10 depicted in FIG. 1 is obtained by changing the order of the laminate blocks constituting the laminate 20.

The laminate manufacturing apparatus 100 includes an uncoiler 110 on which a roll C is mounted, a feeder 130 configured to feed a belt-like core material (hereinafter referred to as "sheet W") drawn from the roll C, a progressive die 140 configured to perform stamping on the sheet W, and a press machine 120 configured to cause the progressive die 140 to operate.

The uncoiler 110 rotatably holds the roll C. The length of a magnetic steel sheet constituting the roll C is 500 to 10,000 meters, for example. The thickness of the magnetic steel sheet constituting the roll C may be about 0.1 to 0.5 millimeter, or may be about 0.1 to 0.3 millimeter from a viewpoint of achieving more excellent magnetic properties of the laminated core R. The width of the magnetic steel sheet W may be about 50 to 500 millimeters.

The feeder 130 has a pair of rollers 130a and 130b that sandwich the sheet W from above and below. The sheet W is fed into the progressive die 140 via the feeder 130. The progressive die 140 is a device configured to serially perform, for example, stamping and push-back on the sheet W.

Figure 5:
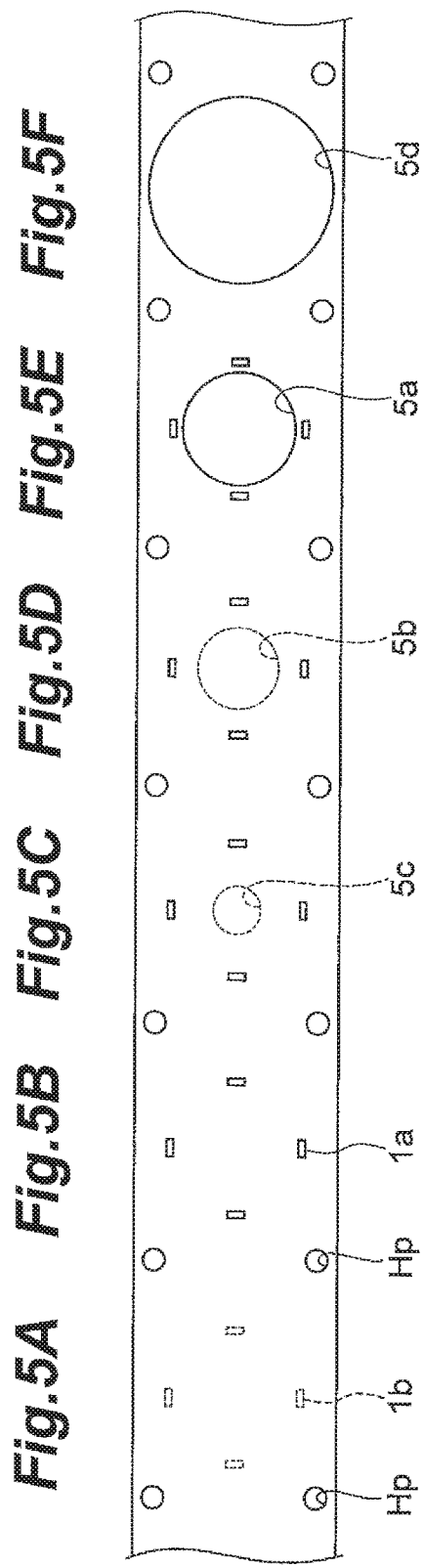
FIG. 5A to FIG. 5F are schematic views for illustrating one example of a stamping layout for manufacturing core pieces of equal to or more than two different shapes.

FIG. 5A to FIG. 5F are schematic views for illustrating a stamping layout for manufacturing core pieces constituting the laminate 20. A step illustrated by FIG. 5A is a step of forming pilot holes Hp and, as necessary, the punched holes 1b on the sheet W. A step illustrated by FIG. 5B is a step of forming the swaged areas 1a as necessary on the sheet W. Each of FIG. 5C to FIG. 5E illustrates a step of forming an opening 5c, an opening 5b, or an opening 5a on the sheet W. The opening 5a constitutes the first expanded-diameter part 12a, the opening 5b constitutes the second expanded-diameter part 12b, and the opening 5c constitutes the shaft-hole body part 12c. The protruding lengths of punches (not depicted) for respectively forming the punched holes 1b and the swaged areas 1a, and the opening 5a, the opening 5b, and the opening 5c are variable. The punched holes 1b or the swaged areas 1a, and the opening 5a, the opening 5b, or the opening 5c are formed as appropriate on the sheet W depending on an appearance of a core piece to be manufactured. A step illustrated by FIG. 5F is a step of stamping out a core piece on the outer circumference (step of forming an opening 5d).

The progressive die 140 has a function of serially stacking core pieces obtained through stamping together to manufacture the laminate 20 and a function of discharging the manufactured laminate 20. As depicted in FIG. 6, a die 141 is positioned below a punch P configured to perform stamping at the outer circumference of core pieces, and a squeeze ring 141a is positioned below the die 141. The squeeze ring 141a has an inner diameter slightly smaller than the outer diameter of the core pieces. A core piece stamped out by the punch P is press-fitted into an upper opening of the squeeze ring 141a of the die 141. Core pieces to be fastened by the swaged areas 1a are fastened by the pressing force of the punch P, the reaction force of a support 142, and the friction force against the inner surface of the squeeze ring 141a. Core pieces are gradually pushed out of a lower opening of the squeeze ring 141a. When the laminate 20 has been formed on the support 142, the support 142 moves downward and becomes flush with a stage 143. A pusher 145 on a side operates in this state to convey the laminate 20 to the next step.

[Method of Manufacturing Laminated Core for Rotor]

A method of manufacturing the laminated core R will be described next. This manufacturing method includes the following steps in this order.

Feeding the sheet W to the progressive die 140.

Stamping out core pieces 3b on which the openings 5b have been formed from the sheet W with the progressive die 140.

Stacking more than one of the core pieces 3b to obtain the laminate block 10b.

Stamping out core pieces 3a on which the openings 5a have been formed from the sheet W with the progressive die 140.

Stacking more than one of the core pieces 3a to obtain the laminate block 10a.

Stamping out core pieces 3a on which the openings 5a have been formed from the sheet W with the progressive die 140.

Stacking more than one of the core pieces 3a to obtain the laminate block 10a.

Stamping out core pieces 3b on which the openings 5b have been formed from the sheet W with the progressive die 140.

Stacking more than one of the core pieces 3b to obtain the laminate block 10b.

Stamping out core pieces 3c on which the openings 5c have been formed from the sheet W with the progressive die 140, Stacking more than one of the core pieces 3c to obtain the laminate block 10c.

Stamping out core pieces 3c on which the openings 5c have been formed from the sheet W with the progressive die 140.

Stacking more than one of the core pieces 3c to obtain the laminate block 10c,

Discharging the laminate 20 having a constitution depicted in FIG. 4 from the progressive die 140.

Changing the lamination order of the laminate blocks constituting the laminate 20 to obtain the laminate 10. This step may be performed automatically with a robotic arm or other devices, or may be performed by hand work.

Integrating the laminate blocks constituting the laminate 10 by welding, adhesion, or other processing.

As described above, in the present embodiment, some change in the thickness of the laminate block 10c does not have large effects on performances of the laminated core R. Thus, the thickness of the laminate block 10c (second laminate block) that is manufactured last in the manufacture of the laminate 20 may be adjusted so that the thickness of the laminated core R to be finally obtained falls within a tolerance. For example, one or more core pieces 3c may be added to the laminate block 10c when the thickness of the laminate 20 is smaller than a target lamination thickness, or one or more core pieces 3c may be removed from the laminate block 10c when the thickness of the laminate 20 is larger than the target lamination thickness. With the present embodiment, a laminated core constituted by combining core pieces of equal to or more than two different shapes can be efficiently manufactured without employing a complicated control program.

Figure 7:
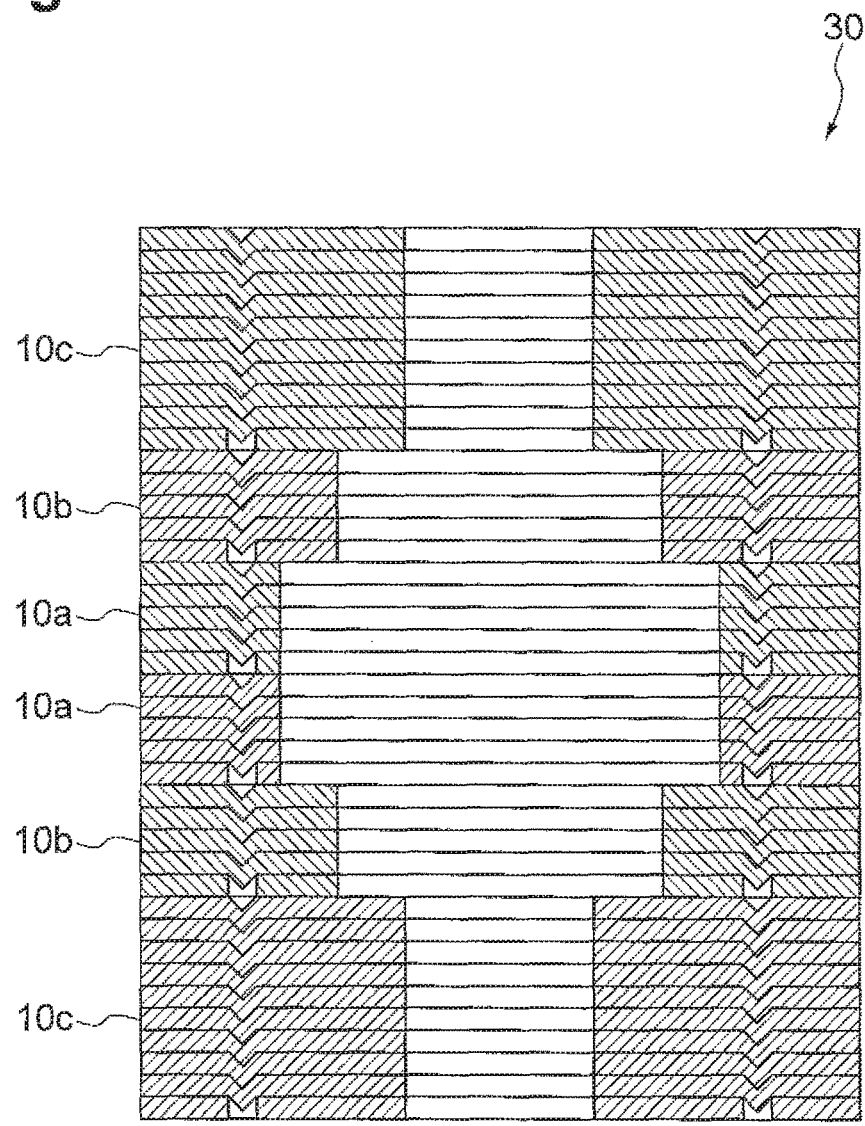
FIG. 7 is a schematic sectional view of another example of a laminate manufactured with the laminate manufacturing apparatus.
Figure 8A:
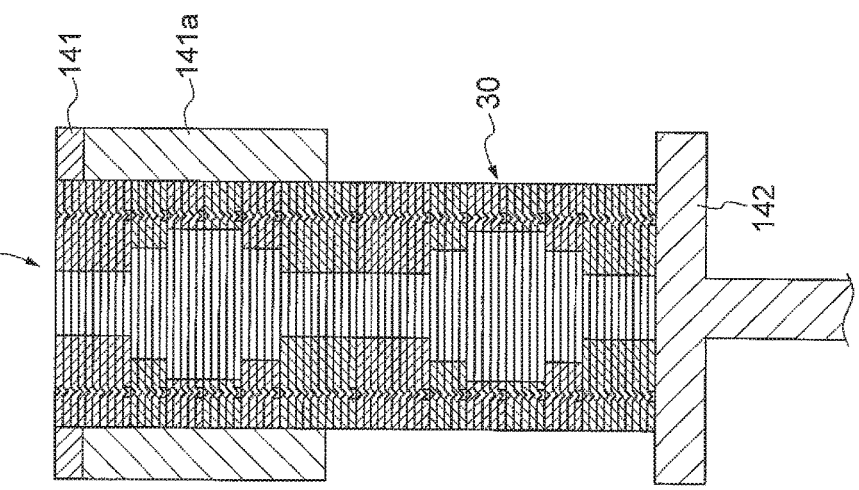
FIG. 8A is a schematic sectional view for illustrating a state in which a support is elevated.
Figure 8B:
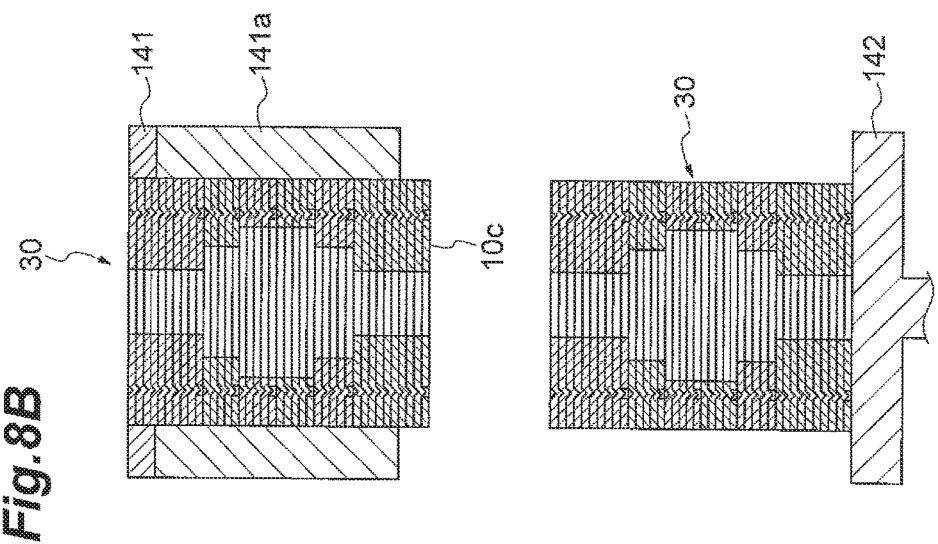
FIG. 8B is a schematic sectional view for illustrating a state in which the support is lowered.

In the foregoing, one embodiment of this disclosure has been described in detail, but this disclosure is not limited to the above embodiment. For example, a case has been exemplified in which the laminate 20 having the lamination order depicted in FIG. 4 is manufactured in the above embodiment, but a plurality of laminate blocks may be laminated in a lamination order depicted in FIG. 7, for example. In a laminate 30 depicted in FIG. 7, beginning at the bottom, the laminate block 10c (first laminate block), the laminate block 10b, the laminate block 10a, the laminate block 10a, the laminate block 10b, and the laminate block 10c (second laminate block) are laminated in this order. Specifically, the laminate block having the largest lamination thickness among the laminate blocks constituting the laminate 30 is formed first in the laminate manufacturing apparatus 100. Employing this constitution has the effect that the laminate 30 can be stably discharged from the progressive die 140. The reason is as follows. As depicted in FIG. 8A an FIG. 8B, when the support 142 moves downward in order to discharge, from the progressive die 140, the laminate 30 that has been produced, another laminate 30 above the laminate 30 is not supported by the support 142. When the thickness of the laminate block 10c at the lowermost position of the laminate 30 is sufficiently large, the laminate block 10c can be sufficiently prevented from dropping out of the squeeze ring 141a even in the state depicted in FIG. 8B.

A case has been exemplified in which the laminated core R internally having counterbores is manufactured in the above embodiment, but this disclosure may be applied to the manufacture of a laminated core internally having a flow path for a refrigerant. The number of laminate blocks constituting a laminate is not limited to six and may be equal to or more than two. The number is preferably four to six and may be six to ten.

A case has been exemplified in which the laminated core R for a rotor is manufactured in the above embodiment, but this disclosure may be applied to the manufacture of a laminated core for a stator. In the above embodiment, a case has been exemplified in which core pieces are stamped out from one sheet W, but core pieces may be stamped out from a plurality of sheet W that are stacked together. In this case, when a plurality of sheet W are used in combination, different types, thicknesses, and/or widths may be used in combination. In addition, both core pieces for a rotor and core pieces for a stator may be stamped out from one sheet W. In the above embodiment, a case has been exemplified in which the laminate blocks are each integrated by the swaged areas 1a and the punched holes 1b, but temporary-interlocking portions may be employed so that swaged areas does not remain in the laminated core as a final product. The "temporary-interlocking portion" is a swaged area used for temporarily integrating a plurality of core pieces produced by stamping, and then removed in a process of manufacturing a product (laminated core).

As described above, the invention disclosed in Japanese Unexamined Patent Publication No. 11-55906 employs a control program that corrects the number of sheets to be laminated of a particular portion when a laminated core constituted by combining core pieces of equal to or more than two different shapes is to be manufactured. However, there have been situations that correction of the number of sheets to be laminated by conventional control programs cannot sufficiently manage the manufacture of laminate core in recent years because constitutions of laminated cores have been becoming complicated as the laminated core having a flow path for a refrigerant disclosed in Japanese Unexamined Patent Publication No. 2010-263757, for example.

A plurality of embodiments of this disclosure have been made in view of the above problem and have an object to provide a method that is useful for efficiently manufacturing a laminated core constituted by combining core pieces of equal to or more than two different shapes.

One side of this disclosure relates to a method of manufacturing a laminated core constituted by combining core pieces of equal to or more than two different shapes. This manufacturing method includes a step of feeding a belt-like core material to a progressive die, a step of stamping out core pieces having a first shape from the core material, a step of stacking more than one of the core pieces having the first shape to obtain a first laminate block, a step of stamping out core pieces having a second shape from the core material, a step of stacking more than one of the core pieces having the second shape to obtain a second laminate block, a step of discharging a laminate including the first laminate block and the second laminate block from the progressive die, a step of changing the lamination order of the laminate blocks constituting the laminate, and a step of integrating the laminate after the lamination order of the laminate blocks are changed.

By the above manufacturing method, a laminate is manufactured in which a plurality of laminate blocks are stacked in any given order in a manufacturing process of a laminated core. After that, the laminated core is manufactured through a step of changing the lamination order. Thus, a laminate block that does not have large effects on performances of the laminated core when the lamination thickness changes to some extent may be selected as appropriate as the last laminate block constituting the above laminate. A laminated core having a lamination, thickness within a tolerance can be efficiently manufactured by adjusting the thickness of this last laminate block and then changing the lamination order of the laminate blocks constituting the laminate.

An example of the above "laminate block that does not have large effects on performances of the laminated core" is a laminate block having a relatively large lamination thickness among laminate blocks constituting a laminate. Specifically, for example, when the second laminate block is formed last in the progressive die among the laminate blocks constituting the laminate, this second laminate block preferably has the largest or the second largest lamination thickness. In this case, the number of sheets to be laminated of the second laminate block may be adjusted so that the thickness of the laminated core falls within a tolerance.

In this disclosure, when the first laminate block is formed first in the progressive die among the laminate blocks constituting the laminate, this first laminate block may have the largest or the second largest lamination thickness. In this case, when the first laminate block is integrated by swaging, the effect that the laminate can be stably discharged from the progressive die is exerted (see FIG. 8A and FIG. 8B).

A plurality of embodiments of this disclosure provide a manufacturing method that is useful for efficiently manufacturing a laminated core constituted by combining core pieces of equal to or more than two different shapes.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

What is claimed is:

1. A method of manufacturing a laminated core constituted by combining core pieces of equal to or more than two different shapes, the manufacturing method comprising the steps of:
   feeding a sheet of core material to a progressive die;
   stamping out core pieces having a first shape from the core material;
   stacking more than one of the core pieces having the first shape to obtain a first laminate block;
   stamping out core pieces having a second shape from the core material;
   stacking more than one of the core pieces having the second shape to obtain a second laminate block, the second laminate block having a different lamination thickness than the first laminate block;
   discharging a laminate including the first laminate block and the second laminate block from the progressive die;
   switching the lamination order of the laminate blocks constituting the laminate such that another laminate is formed; and
   integrating the another laminate after the lamination order of the laminate blocks are switched.

2. The method of manufacturing a laminated core according to claim 1, wherein the second laminate block is formed last in the progressive die among the laminate blocks constituting the laminate and has the largest or has the second largest lamination thickness.

3. The method of manufacturing a laminated core according to claim 2, the manufacturing method further comprising the step of adjusting the number of sheets to be laminated of the second laminate block so that the thickness of the laminated core falls within a tolerance.

4. The method of manufacturing a laminated core according to claim 3, wherein the first laminate block is formed first in the progressive die among the laminate blocks constituting the laminate and has the largest or the second largest lamination thickness.

5. The method of manufacturing a laminated core according to claim 4, wherein the first laminate block is integrated by swaging.

6. The method of manufacturing a laminated core according to claim 2, wherein the first laminate block is formed first in the progressive die among the laminate blocks constituting the laminate and has the largest or the second largest lamination thickness.

7. The method of manufacturing a laminated core according to claim 6, wherein the first laminate block is integrated by swaging.

8. The method of manufacturing a laminated core according to claim 1, wherein the first laminate block is formed first in the progressive die among the laminate blocks constituting the laminate and has the largest or the second largest lamination thickness.

9. The method of manufacturing a laminated core according to claim 8, wherein the first laminate block is integrated by swaging.

10. The method of manufacturing a laminated core according to claim 1, wherein the number of laminated blocks is greater than two.

11. The method of manufacturing a laminated core according to claim 1, wherein the switching the lamination order occurs outside the progressive die.

* * * * *